US012767064B2

(12) United States Patent
Kowal et al.

(10) Patent No.: US 12,767,064 B2
(45) Date of Patent: Oct. 20, 2026

(54) MULTI-DIRECTIONAL ADJUSTABLE FASTENER

(71) Applicant: Rivian IP Holdings, LLC, Irvine, CA (US)

(72) Inventors: Stephen Kowal, Allen Park, MI (US); Curtis McNamara, Livonia, MI (US); Daniel Calder, Ladera Ranch, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 509 days.

(21) Appl. No.: 18/352,170

(22) Filed: Jul. 13, 2023

(65) Prior Publication Data

US 2025/0018878 A1 Jan. 16, 2025

(51) Int. Cl.
*F16B 5/02* (2006.01)
*B60R 13/00* (2006.01)
*B60R 19/18* (2006.01)

(52) U.S. Cl.
CPC ............ *B60R 13/00* (2013.01); *F16B 5/0225* (2013.01); *F16B 5/0233* (2013.01); *B60R 19/18* (2013.01); *B60R 2019/1886* (2013.01)

(58) Field of Classification Search
CPC .... F16B 5/0233; F16B 5/0216; F16B 5/0225; F16B 5/025; F16B 39/282
USPC .................................................. 411/546, 535
See application file for complete search history.

(56) References Cited

U.S. PATENT DOCUMENTS 487,721 A * 12/1892 Kalb ........................ F16B 31/04 411/533
1,933,536 A * 11/1933 Awbrey ................ F16B 5/0225 52/707
2,163,446 A * 6/1939 Heckman .............. F16B 5/0225 52/707
4,256,211 A * 3/1981 Katkov ................. F16D 25/126 192/111.1
4,433,879 A * 2/1984 Morris .................. F16B 5/0642 411/535
4,529,244 A * 7/1985 Zaydel ................. B62D 29/048 24/297
5,180,268 A * 1/1993 Richardson ............. F16B 31/04 411/536
5,492,388 A * 2/1996 Kawasaki ............ B62D 25/147 411/535
5,630,639 A * 5/1997 Horwill ................... B60R 11/00 296/91
5,895,189 A * 4/1999 Ruckert ................ F16B 5/0233 403/DIG. 1
8,439,456 B2 * 5/2013 Kiechle ................. F16B 5/0233 411/546
8,579,572 B1 * 11/2013 Psimas .................. F16B 43/009 411/7

(Continued)

*Primary Examiner* — Flemming Saether
(74) *Attorney, Agent, or Firm* — Baker Hostetler

(57) ABSTRACT

Aspects of the disclosure relate to an adjustable fastener to facilitate adjustment of an assembly that allows any two or more components to be adjusted relative to each other and control an interface region there between. An adjustable fastener can include features to facilitate adjustment in multiple axes and within particular ranges. Adjustment within each of the multiple axes can be achieved independently of each other. Such adjustment capabilities can help to improve the alignment of parts during and after assembly to achieve a desired arrangement with high precision and accuracy.

19 Claims, 7 Drawing Sheets

(56) References Cited

U.S. PATENT DOCUMENTS

| | | | | |
|---|---|---|---|---|
| 10,407,914 | B2 * | 9/2019 | Seo | E04F 11/1041 |
| 11,359,416 | B2 * | 6/2022 | Heyduck | E05B 79/06 |
| 2007/0009342 | A1 * | 1/2007 | Figge | F16B 5/025<br>411/546 |
| 2019/0242425 | A1 * | 8/2019 | Chen | F16B 35/065 |
| 2023/0313830 | A1 * | 10/2023 | Tulloch | F16B 43/009<br>411/535 |

* cited by examiner

MULTI-DIRECTIONAL ADJUSTABLE FASTENER

INTRODUCTION

Vehicles often include assembled parts that are designed to be aligned in a particular way. For example, surfaces and/or edges of separate parts can be aligned with an intended gap and/or to be flush with each other. Such an alignment can extend across opposing surfaces and/or edges of the separate parts. Where one or more of the parts has a shape that is not within a tolerance and/or changes over time, it can be desirable to adjust the space between assembled parts to achieve the desired alignment.

Aspects of the subject technology can help to improve alignment of assembled parts by providing multi-directional adjustment capabilities with an adjustable fastener.

SUMMARY

The present description relates generally to adjustable assemblies, including, for example, adjustable assemblies for vehicles. Aspects of the subject technology can help to improve alignment of assembled parts by providing multi-directional adjustment capabilities with an adjustable fastener. Implementations of the subject technology described herein provide an adjustable fastener to facilitate adjustment of an assembly that allows any two or more components to be adjusted relative to each other and control an interface region there between. One or more implementations of the disclosure relate to a mechanism for adjusting components in various directions and within particular ranges during assembly to achieve the desired alignment. One or more implementations of the disclosure relate to a mechanism for adjusting components after assembly to compensate for changes in the constituent components.

In accordance with one or more aspects of the disclosure, an adjustable fastener can include a plunger, a puck key, a selector key, and a lock collar. The plunger can include a head, a shaft, and a plunger engager extending from the head alongside the shaft. The puck key can be configured to receive the shaft and having multiple sections, each of the sections defining a corresponding height that is different than a height of another section. The selector key can be configured to receive the shaft and comprising a tooth for contacting a selected one of the sections of the puck key. The lock collar can be configured to engage the shaft and secure the selector key against the puck key.

In accordance with one or more aspects of the disclosure, the plunger can include a head, a shaft for extending through a bracket, and a plunger engager configured to engage one of multiple bracket engagers of the bracket to secure an alignment along a first axis. The puck key can be configured to be rotationally locked to the shaft and having multiple sections. The selector key can be configured to rotate about the shaft, wherein a rotational orientation of the selector key with respect to the puck key defines a distance, along a second axis, between the selector key and the head of the plunger. The lock collar can be configured to adjustably engage the shaft and urge the selector key against the puck key. The first axis can be orthogonal to the second axis In accordance with one or more aspects of the disclosure, an adjustable assembly can include a first component, a second component, a plunger, a puck key, a lock collar, and a selector key. The first component can form a bracket comprising a bracket opening and multiple bracket engagers. The second component can form a mount pad comprising a pad opening. The plunger can include a shaft extending through the bracket opening and the pad opening and a plunger engager can be configured to engage one of the bracket engagers to limit movement of the bracket across the mount pad. The puck key can have multiple sections, each of the sections defining a corresponding height that is different than a height of another section. The lock collar can extend through the pad opening and engaging the shaft of the plunger. The selector key can be positioned between the lock collar and the puck key, the selector key being rotatable to engage a selected one of the sections of the puck key that determines a corresponding distance between the bracket and the mount pad.

According to some aspects, the shaft of the plunger can include a first section defining a first cross-sectional shape for rotationally engaging the puck key, a second section defining a second cross-sectional shape for receiving the selector key, and a third section defining a thread for engagement by the lock collar.

According to some aspects, the puck key defines a puck opening for receiving the shaft, and each one of the sections of the puck key is circumferentially adjacent to another one of the sections having a different height and radially opposite another one of the sections having a same height. Each one of the sections of the puck key can define a ridge alongside an adjacent other one of the sections. The sections of the puck key can define surfaces facing in a same direction, each of the surfaces being concave.

According to some aspects, the selector key can include a selector opening for receiving the shaft and a pair of teeth on opposing sides of the selector opening. The tooth of the selector key can be a first tooth, the selector key can define a selector opening for receiving the shaft, and the selector key can include a second tooth across the selector opening from the first tooth.

According to some aspects, the lock collar can include a first flange and a second flange defining an annular recess between the first flange and the second flange.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In many vehicles, parts are assembled with an intended gap and/or alignment (e.g., abutment) between the assembled parts. For example, exterior parts can be provided in an alignment that presents parallel edges and/or flush surfaces. Accordingly, it can be desirable to control aspects of any interface region to maintain a consistent alignment between any two assembled components. An adjustable fastener can provide compensations to align components of an assembly. For example, it can be beneficial to provide a mechanism for adjusting components in various directions and within a range of modifications during assembly to achieve the desired alignment. Additionally or alternatively, misalignments arising after assembly can also be corrected by operating an adjustable fastener to align the components as desired.

Implementations of the subject technology described herein provide an adjustable fastener to facilitate adjustment of an assembly that allows any two or more components to be adjusted relative to each other and control an interface region there between. As described herein, aspects of the subject technology can help to improve the alignment of parts during and after assembly to achieve a desired arrangement with high precision and accuracy.

Figure 1:
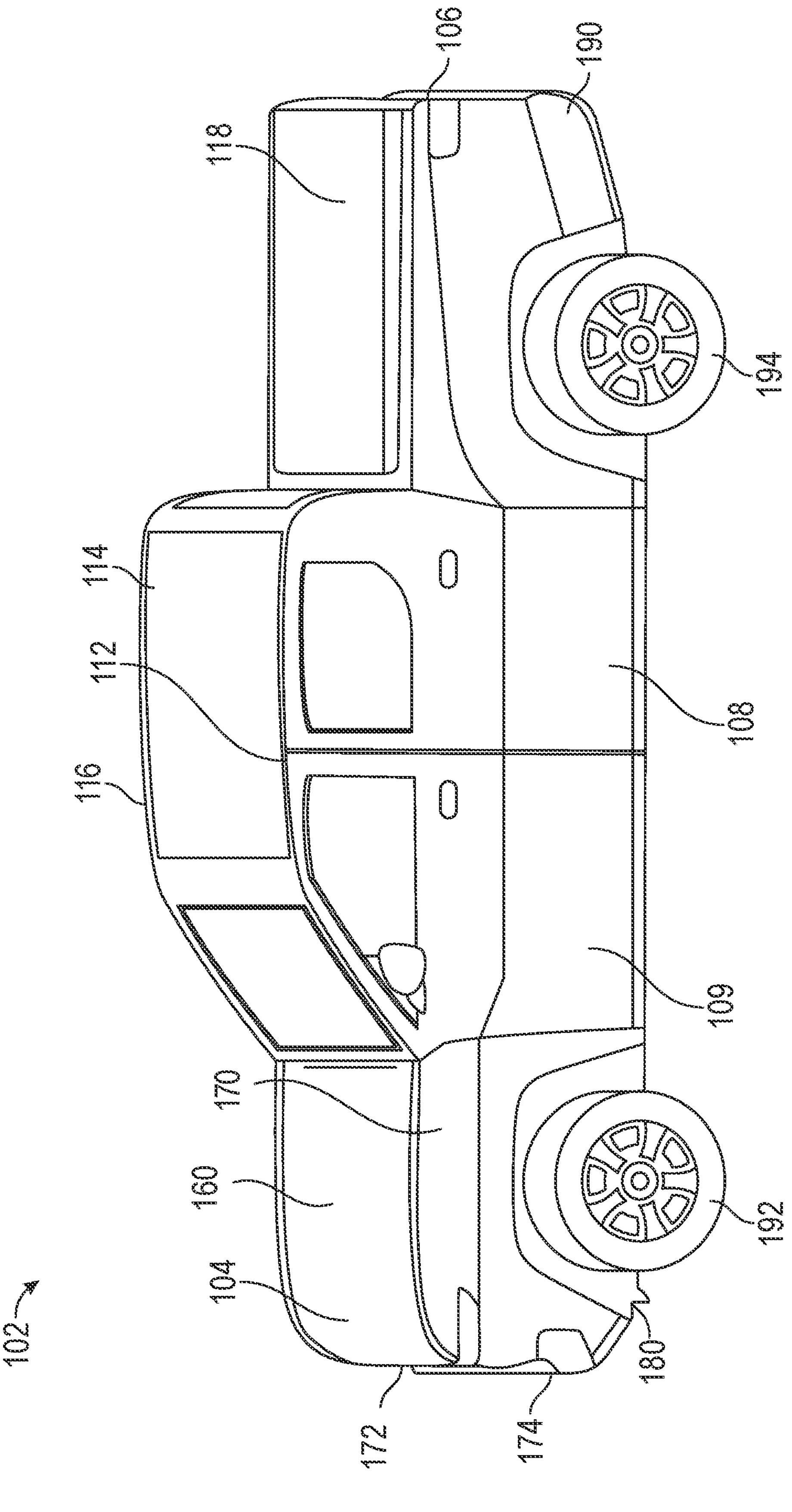
FIG. 1 illustrates a schematic perspective side views of example implementations of a vehicle in accordance with one or more implementations.

FIG. 1 is a diagram illustrating an example implementation of an apparatus as described herein. In the example of FIG. 1, an apparatus is implemented as a moveable apparatus, such as a vehicle 102. As shown, the vehicle 102 may have a front portion 104 and a rear portion 106. A cabin 108 may be located between the front portion 104 and the rear portion 106 of the vehicle 102. The cabin 108 may include entry doors 109. As illustrated, the vehicle 102 has a left side 112 and a right side 116.

Vehicle 102 may include a roof 114. Vehicle 102 may have one or more cargo spaces, such as a cargo bed or truck bed 118 (also referred to herein as a "trunk") and/or a hood 160 (e.g., covering a cargo area, front trunk, or a "frunk"). Cargo bed 118 is typically located at or near the rear portion 106 of the vehicle. Vehicle 102 may have one or more front wheels 192 and one or more rear wheels 194. Vehicle 102 of FIG. 1 may be a unibody truck, which may have a storage bed. One or more portions of a body 180 of the vehicle 102 may be constructed of steel alloy and/or aluminum alloy or other suitable materials.

As shown in the example of FIG. 1, the vehicle 102 may include one or more front fascia, such as a side front fascia 170, an upper front fascia 172, and/or a lower front fascia 174. As shown, the side front fascia 170 is located at the front end of the vehicle 102. Each of the side front fascia 170, the upper front fascia 172, and/or the lower front fascia 174 may provide an aesthetic front look for the vehicle 102 and may be arranged to provide external aerodynamic properties for the vehicle 102. By further example, one or more of the side front fascia 170, the upper front fascia 172, and/or the lower front fascia 174 can serve as a fender or bumper. In one or more implementations, each of the side front fascia 170, the upper front fascia 172, and/or the lower front fascia 174 may be implemented as removable sections of the front portion 104 of the vehicle 102 and may be comprised of plastic or non-metal components (carbon fiber) that hide one or more structural elements (e.g., bodywork/frame) and give the vehicle a desired outer shape. Each of the side front fascia 170, the upper front fascia 172, and/or the lower front fascia 174 can be adjustably coupled to the body 180 of the vehicle 102, as further described herein.

As further shown in the example of FIG. 1, the vehicle 102 may include one or more rear fascia, such as a rear fascia 190. As shown, the rear fascia 190 is located at the rear portion 106 of the vehicle 102. The rear fascia 190 may provide an aesthetic rear look for the vehicle 102 and may be arranged to provide external aerodynamic properties for the vehicle 102. By further example, the rear fascia 190 can serve as a fender or bumper. In one or more implementations, the rear fascia 190 may be implemented as removable sections of the rear portion 106 of the vehicle 102 and may be comprised of plastic or non-metal components (carbon fiber) that hide one or more structural elements (e.g., bodywork/frame) and give the vehicle a desired outer shape. The rear fascia 190 can be adjustably coupled to the body 180 of the vehicle 102, as further described herein.

While examples illustrated herein show adjustable fasteners and assemblies for coupling certain components (e.g., front fascia or rear fascia and the body, etc.) of a vehicle, it will be understood that the adjustable fasteners and/or assemblies described herein can be applied to any two or more components of the vehicle. Furthermore, it will be understood that the adjustable fasteners and/or assemblies described herein can be applied to any one of a variety of technologies, including any assembly of parts.

Figure 2:
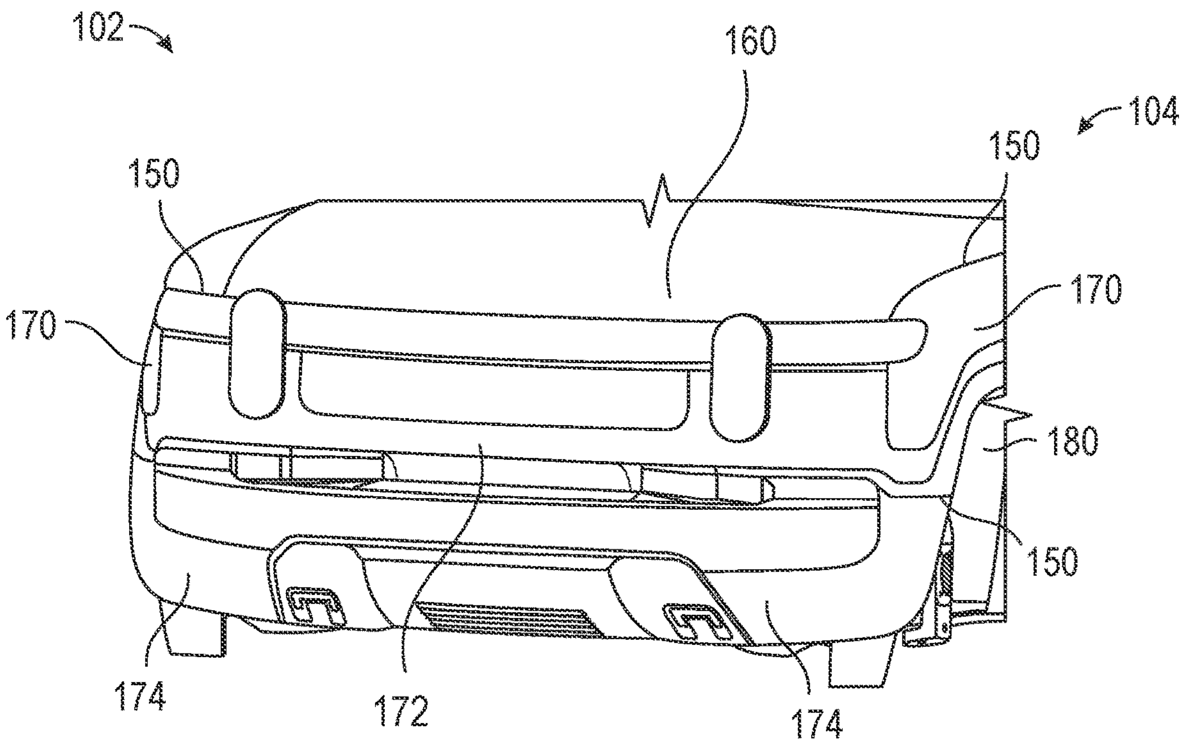
FIG. 2 illustrates a schematic front perspective view of an example implementation of a vehicle in accordance with one or more implementations.

Referring now to FIG. 2, a portion (e.g., front portion) of the vehicle can include an assembly of parts. FIG. 2 illustrates a front perspective view of the front portion 104 of the vehicle 102 in accordance with one or more implementations. As shown in FIG. 2, the vehicle 102 may include the body 180 with each of the side front fascia 170, the upper front fascia 172, and/or the lower front fascia 174 being adjustably coupled to the body 180 and/or another structure. As shown in FIG. 2, an interface region 150 can be formed between any two components of the vehicle 102. Such an interface region 150 can form a gap, other space, or abutment between two or more components. For example, an interface region 150 can be formed between each of the hood 160 and the side front fascia 170, the hood 160 and the upper front fascia 172, the upper front fascia 172 and the lower front fascia 174, and/or any other two components.

Figure 3:
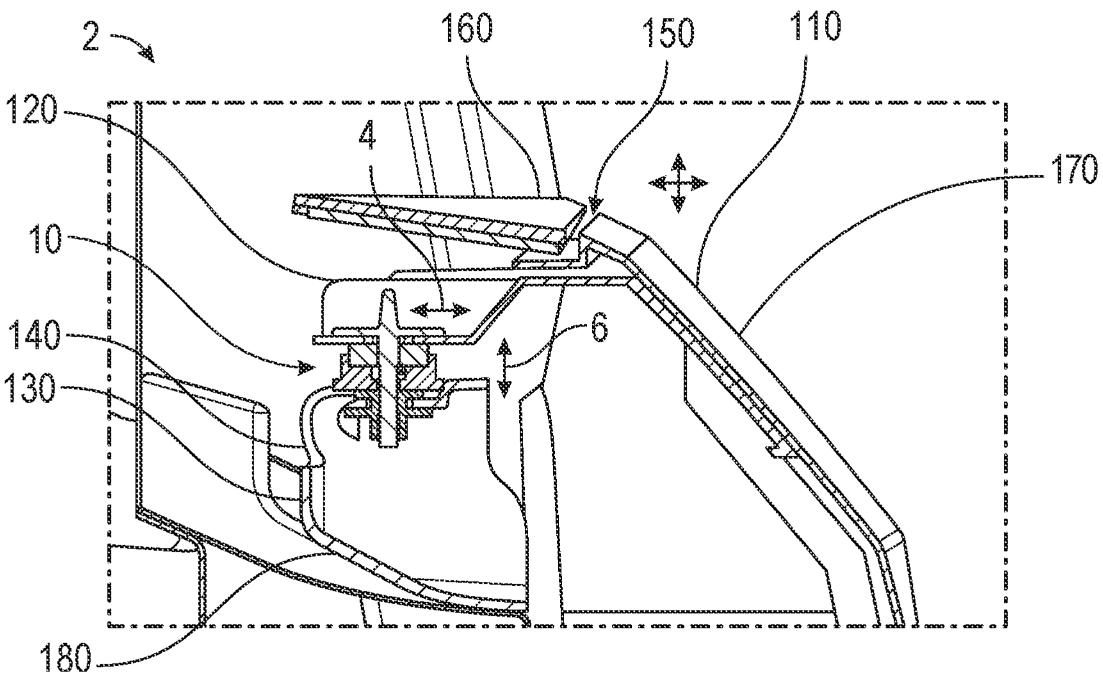
FIG. 3 illustrates a perspective view of an adjustable assembly, in accordance with implementations of the subject technology.

Referring now to FIG. 3, an adjustable fastener can couple any two components of a vehicle together to provide an ability to adjust the two (and/or other) components relative to each other. As shown in FIG. 3, the adjustable assembly 2 oh can include a first component 110 and a second component 130. An adjustable fastener 10 can be directly coupled to each of the first component 110 and the second component 130.

In the example shown in FIG. 3, the first component 110 is shown to include or be part of the side front fascia 170, and the second component 130 is shown to include or be part of the body 180. It will be understood that the first component 110 and/or the second component 130 can represent any one or more components of the vehicle. As such, the adjustable assembly 2 can include an adjustable fastener 10 that is directly coupled to any two components to adjust the relative positions thereof.

The first component 110 can provide a bracket 120 for engagement with the adjustable fastener 10. The bracket 120 can be formed by, coupled to, included with, and/or defined by the first component 110. For example, one or more portions of the first component 110 can have a position that corresponds to a position of the bracket 120. The second component 130 can provide a mount pad 140 for engagement with the adjustable fastener 10. The mount pad 140 can be formed by, coupled to, included with, and/or defined by the second component 130. For example, one or more portions of the second component 130 can have a position that corresponds to a position of the mount pad 140. By adjusting the adjustable fastener 10, the relative positions of the bracket 120 and the mount pad 140 can be adjusted, thereby adjusting the relative positions of the first component 110 and the second component 130.

The adjustable fastener 10 can provide an ability to adjustably secure the first component 110 and the second component 130 relative to each other in one of multiple configurations. For example, the adjustable fastener 10 can be adjusted to be secured in one of multiple positions along a first axis 4 and/or a second axis 6. Based on the configuration of the adjustable fastener 10, the first component 110 can have a first position with respect to the second component 130 along the first axis 4. For example, adjustment of the adjustable fastener 10 with respect to the first axis 4 can represent a selection of a lateral position of the first component 110 with respect to the second component 130, such as by sliding across each other. Additionally, based on the configuration of the adjustable fastener 10, the first component 110 can have a first position with respect to the second component 130 along the second axis 6. For example, adjustment of the adjustable fastener 10 with respect to the second axis 6 can represent a selection of a distance between the first component 110 and the second component 130. In some implementations, the first axis 4 can be transverse to the second axis 6. In some implementations, the first axis 4 can be orthogonal to the second axis 6. The adjustable fastener 10 can be adjusted independently in each of the first axis 4 and the second axis 6. By providing independent adjustment capabilities in each of two different axes, the relative positions of the first component 110 and the second component 130 can be adjusted so that the interface region 150 is controlled as desired.

It will be understood that the interface region 150 can be formed between any two components (e.g., first component 110 and second component 130), including components to which the adjustable fastener 10 is not directly coupled. For example, as shown in FIG. 3, the adjustable fastener 10 can be directly coupled to each of the side front fascia 170 and the body 180, wherein adjustments to the adjustable fastener 10 can alter the interface region 150 formed between the side front fascia 170 and the hood 160.

It can be desirable to control aspects of the interface region to maintain a consistent alignment between any two components. For example, an interface region can extend along a length between any two components. It can be desirable to provide a particular gap between the two components and/or align the components to be abutting each other. It can further be desirable to maintain a consistent gap or abutment along the entire length between the two components. Accordingly, the adjustable fastener of the present disclosure can provide an adjustable assembly that allows any two or more components to be adjusted relative to each other and control an interface region there between.

While only one adjustable fastener 10 is shown in FIG. 3, it will be understood that multiple adjustable fasteners 10 can be provided. For example, any number of adjustable fasteners 10 can be provided to couple a first component 110 to a second component 130. Each of the multiple adjustable fasteners 10 can be distributed along a length of each of the first component 110 and the second component 130. Each of the adjustable fasteners 10 can be independently adjusted in each of multiple axes to control aspects of a corresponding portion of the interface region 150 between the first component 110 and the second component 130 (and/or other components). Accordingly, an interface region 150 having a length can be adjusted at multiple portions thereof to maintain a consistent or otherwise desired feature thereof along its length.

Figure 4:
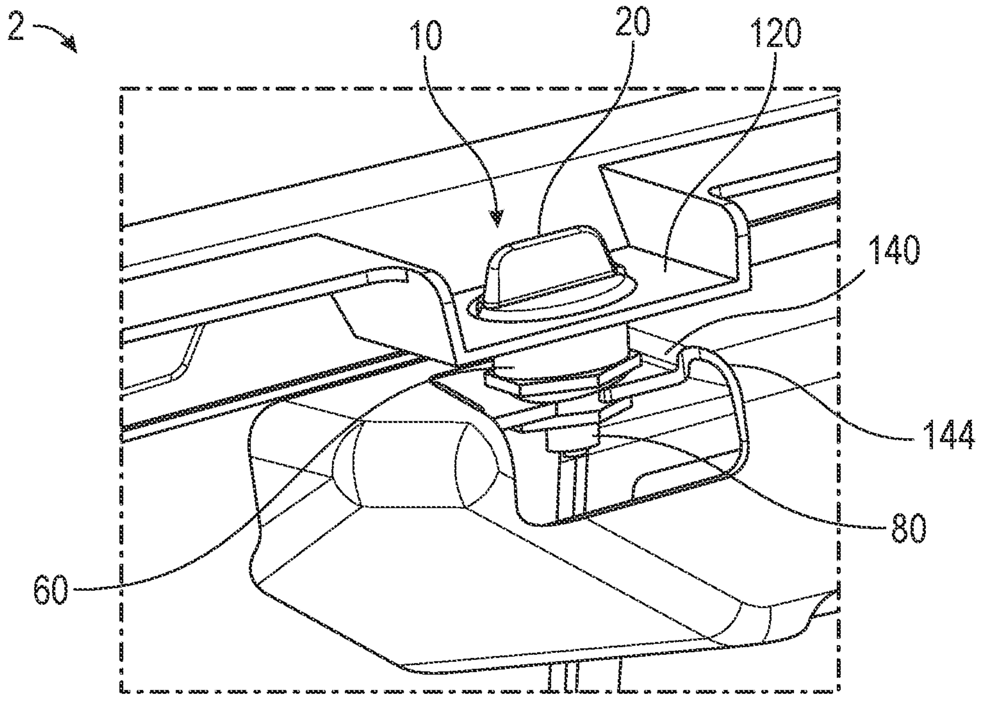
FIG. 4 illustrates a sectional view of the adjustable assembly of FIG. 3, in accordance with implementations of the subject technology.

While the adjustable fastener 10 is shown in FIG. 3 with a particular orientation, thereby providing adjustment in the corresponding first axis 4 and second axis 6, it will be understood that the features of the first component 110 and the second component 130 can be provided to receive the adjustable fastener 10 in any orientation. Accordingly, the first axis 4 and second axis 6 along which adjustment can be provided can be defined by the Referring now to FIG. 4, the adjustable fastener 10 can couple to each of a bracket 120 and a mount pad 140, each corresponding to a different component of the adjustable assembly. As shown in FIG. 4, the adjustable fastener 10 can, itself, include various components assembled together, such as a plunger 20, a puck key (not shown in FIG. 4), a selector key 60, and a lock collar 80. The adjustable fastener 10 can include features that are readily accessible for adjustment thereof. For example, a portion of the plunger 20 can be accessible on a side of the bracket 120 to adjustment of the plunger 20 with respect to the bracket 120. By further example, each of the selector key 60 and the lock collar 80 can be accessible for adjustment (e.g., rotation) to adjust a distance thereof with respect to the plunger 20 and/or the bracket 120. As further shown in FIG. 4, the mount pad 140 can include a window 144 for providing access to the lock collar 80.

Figure 5:
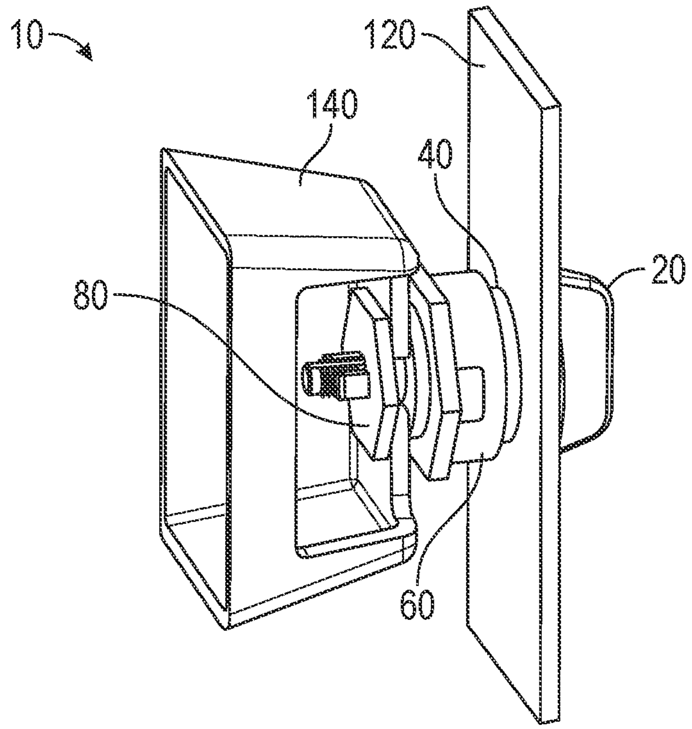
FIG. 5 illustrates a perspective view of an adjustable fastener, in accordance with implementations of the subject technology.
Figure 6:
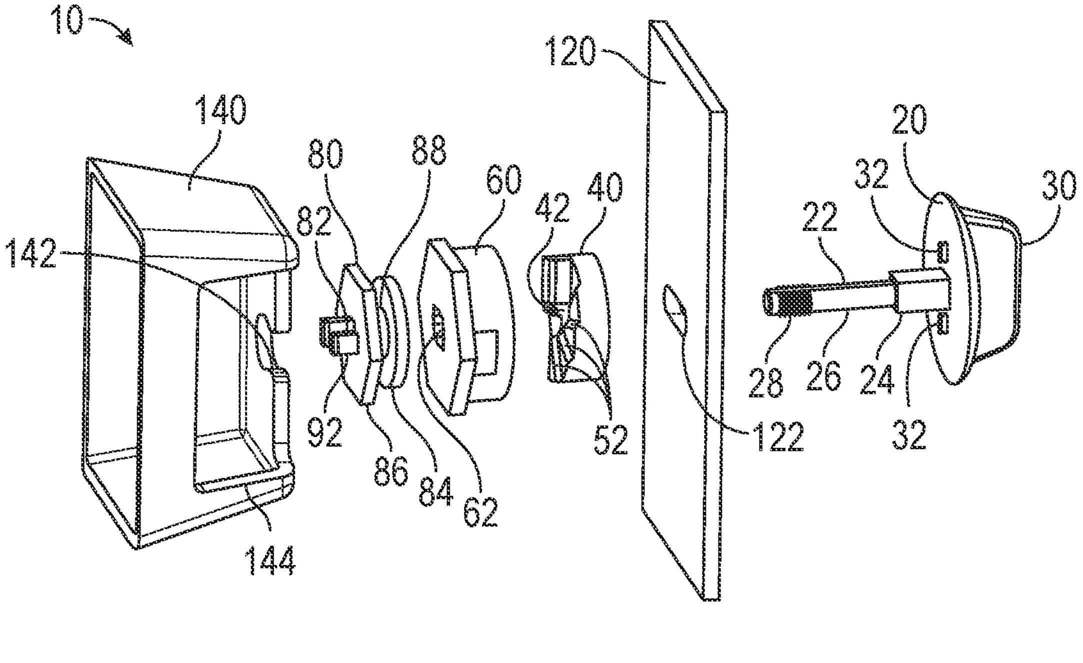
FIG. 6 illustrates an exploded perspective view of the adjustable fastener of FIG. 5, in accordance with implementations of the subject technology.

Referring now to FIGS. 5 and 6, the adjustable fastener 10 can be coupled to each of the bracket 120 and the mount pad 140. The adjustable fastener 10 can provide adjustment capabilities to adjust the relative positions of the bracket 120 and the mount pad 140 with respect to each other in multiple axis. As shown in FIG. 5, the adjustable fastener 10 can include a plunger 20, a puck key 40, a selector key 60, and a lock collar 80. The plunger 20 can extend from and through the bracket 120, through the puck key 40 and/or the selector key 60, and to the mount pad 140 and/or the lock collar 80. Accordingly, the puck key 40 and the selector key 60 can be positioned between the bracket 120 and the mount pad 140 and/or between the plunger 20 (or a portion thereof) and the lock collar 80.

As shown in FIG. 6, the plunger 20 can include a head 30 and a shaft 22 extending from the head 30. The plunger 20 can further include at least one plunger engager 32 extending from the head 30 and alongside the shaft 22. The plunger engager 32 can engage the bracket 120 to secure the adjustable fastener 10 with respect to an axis of adjustment, as described further herein. The shaft 22 of the plunger 20 can include a first section 24 defining a first cross-sectional shape for rotationally engaging the puck key 40, a second section 26 defining a second cross-sectional shape for being received by the selector key 60, and a third section 28 defining a thread or other engagement feature for engagement by the lock collar 80.

As further shown in FIG. 6, the puck key 40 can be configured to be rotationally locked to the shaft 22 of the plunger 20. For example, the puck key 40 can define a puck opening 42 having a particular (e.g., non-circular) cross-sectional shape. The first section 24 of the shaft 22 can include a non-circular cross-sectional shape that corresponds to a cross-sectional shape of the puck opening 42 of the puck key 40. Accordingly, the puck key 40 can be rotationally locked to the plunger 20, such that neither the plunger 20 nor the puck key 40 rotate with respect to the bracket 120 and the mount pad 140. The puck key 40 can further provide multiple sections 52. Each of the sections can define a circumferential region of the puck key 40, with the sections 52 being circumferentially adjacent to each other around the puck opening 42. Each of the sections 52 defines a corresponding height that is different than a height of at least one other section 52, as described further herein. and engaging the shaft 22 of the plunger 20. The selector key 60 can be positioned between the lock collar 80 and the puck key 40, the selector key 60 being rotatable to engage a selected one of the sections 52 of the puck key 40 that determines a corresponding distance between the bracket 120 and the mount pad 140.

As further shown in FIG. 6, the selector key 60 can be configured to rotate about the shaft 22. For example, the selector key 60 can define a selector opening 62 having a particular (e.g., circular) cross-sectional shape. The second section 26 of the shaft 22 can include a circular or other cross-sectional shape that enables rotation of the selector key 60 about the second section 26 of the shaft 22. The selector key 60 can be rotated with respect to the puck key 40 to have a particular orientation. A rotational orientation of the selector key 60 with respect to the puck key 40 defines a distance between the selector key 60 and the head 30 of the plunger 20 and/or the bracket 120, as described further herein.

As further shown in FIG. 6, the lock collar 80 can be configured to adjustably engage the shaft 22 and urge the selector key 60 against the puck key 40. The lock collar 80 can, when assembled, extend through a pad opening 142 of the mount pad 140. For example, the mount pad 140 can include a pad opening 142 for receiving at least a portion of lock collar 80. By further example, the lock collar 80 can include a first flange 84 and a second flange 86 defining an annular recess 88 between the first flange 84 and the second flange 86. The first flange 84 and the second flange 86 can be positioned on opposing sides of the pad opening 142, and the portion of the mount pad 140 defining the pad opening 142 can extend radially inwardly into the annular recess 88 of the lock collar 80. The lock collar 80 can be provided with a rotational or other ability within the pad opening 142 while limiting its axial movement through the pad opening 142. For example, the lock collar 80 can define a lock opening 82, and the third section 28 of the shaft 22 can extend through the lock opening 82 of the lock collar 80. By further example, the lock collar 80 can include a lock engager 92 for engaging the third section 28 of the shaft 22. For example, the third section 28 of the shaft 22 can include a thread, and the lock engager 92 can include a thread or other thread-engaging feature for axially securing the lock collar 80 with respect to the shaft 22 of the plunger. By further example, rotation of the lock collar 80 can axially advance the shaft 22 with respect to the lock collar 80. Additionally or alternatively, the shaft 22 and the lock collar 80 can include one or more other types of engagers. For example, the lock engager 92 and/or the third section 28 of the shaft 22 can include mechanisms such as locks, latches, snaps, slides, channels, screws, clasps, threads, magnets, pins, an interference (e.g., friction) fit, knurl presses, bayoneting, fused materials, weaves, knits, braids, hook and loop fasteners, and/or combinations thereof to couple and/or secure the lock collar 80 to the plunger 20. Adjustment of the lock engager 92 and/or the third section 28 can modify a distance between (i) the lock collar 80, the selector key 60, and/or the mount pad 140 and (ii) the puck key 40, the bracket 120, and/or the head 30 of the plunger 20. For example, the lock engager 92 and/or the third section 28 can be adjusted until the parts of the adjustable fastener 10 are brought into contact with each other, for example without slack or play along the axis of the adjustable fastener 10. Such tightness can bring the selector key 60 into contact with one or more of the sections of the puck key 40 and/or the plunger engager 32 into secure engagement with the bracket engagers (not shown in FIGS. 5 and 6) of the bracket 120.

Figure 7:
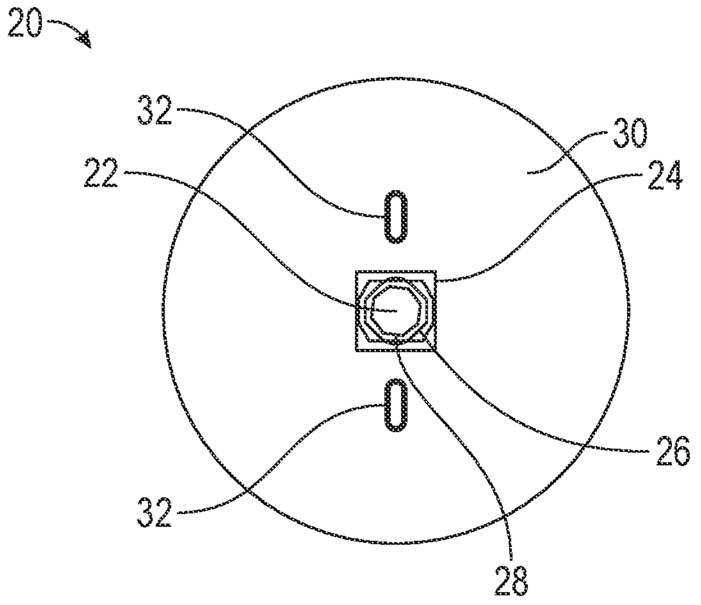
FIG. 7 illustrates a rear view of a plunger, in accordance with implementations of the subject technology.
Figure 8:
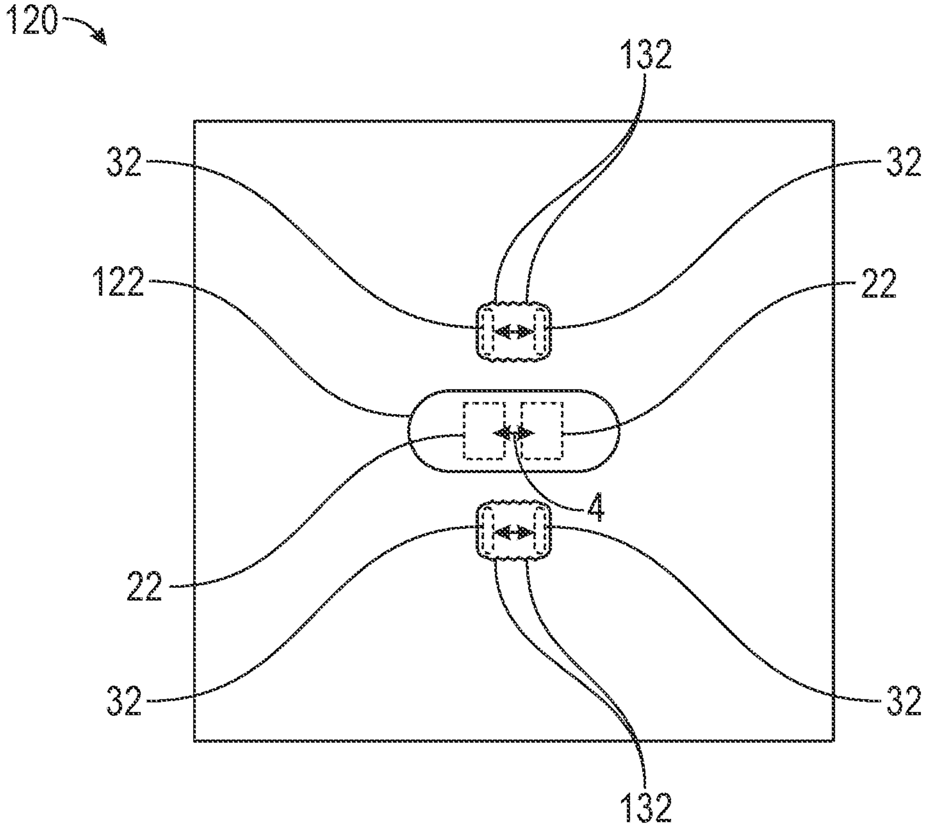
FIG. 8 illustrates a front view of a bracket, in accordance with implementations of the subject technology.

Referring now to FIGS. 7-8, the plunger and the bracket can provide engagement and adjustment capabilities to select one of multiple possible arrangements along an axis and within a range. As shown in FIG. 7, the plunger 20 can include the head 30 and the shaft 22 extending from the head 30. The shaft 22 of the plunger 20 can include the first section 24, the second section 26, and the third section 28. The plunger engager 32 can engage the bracket 120 to secure the adjustable fastener 10 with respect to an axis of adjustment, as described further herein. The plunger 20 can further include one or more plunger engagers 32 configured to secure the plunger 20 with respect to the bracket 120. For example, the plunger engagers 32 can each engage one of multiple bracket engagers 132 of the bracket 120, as shown in FIG. 8, to secure an alignment of the plunger 20 along a first axis 4 and within a range defined by the bracket 120.

As further shown in FIG. 8, the bracket 120 can include a bracket opening 122 for receiving the shaft 22 of the plunger 20. The bracket 120 can further define one or more bracket engagers 132. The bracket engagers 132 can each be provided in a set for receiving a corresponding one of the one or more plunger engagers 32. For example, multiple bracket engagers 132 can be distributed in a row along the first axis 4. A plunger engager 32 can be secured with respect to one of the multiple bracket engagers 132. While secured thereto, the plunger engager 32 can be restricted with respect to the first axis 4, such that the plunger 20 does not move along the first axis 4 until the plunger engager 32 is released from the selected one of the bracket engagers 132. Such release can be achieved, for example, by moving the plunger 20 away from the bracket 120, such as along the second axis, transverse (e.g., orthogonal) to the first axis 4. It will be understood that such release can be prevented by the arrangement of the lock collar with respect to the plunger 20, as described herein.

The plunger engagers 32 and/or the bracket engagers 132 can be arranged to provide multiple possible arrangements available for selection. For example, any number of arrangements can be provided, such as 2, 3, 4, 5, 6, 7, 8, 9, or more than 9 arrangements by selecting the arrangement of plunger engagers 32 with respect to bracket engagers 132. Each arrangement can correspond to a different alignment along the first axis 4. Accordingly, the selected engagement between plunger engagers 32 and/or the bracket engagers 132 can be made to achieve the desired alignment (e.g., of an interface region) of the corresponding components along the first axis 4.

As shown, the plunger engagers 32 can each include a protrusion, and the bracket engagers 132 can each include a recess for receiving the protrusion. Each recess of the bracket engagers 132 can be at least partially divided from the others, for example by a partition. It will be understood that other arrangements can be provided, such as one in which the plunger engagers 32 can each include a recess, and the bracket engagers 132 can each include a protrusion. While multiple bracket engagers 132 are shown for each plunger engager 32, it will understood that other arrangements can be provided, such as a bracket engager 132 for engaging one of multiple plunger engagers 32. Additionally or alternatively, the plunger engagers 32 and the bracket engagers 132 can include one or more other types of engagers. For example, the plunger engagers 32 and the bracket engagers 132 can include mechanisms such as locks, latches, snaps, slides, channels, screws, clasps, threads, magnets, pins, an interference (e.g., friction) fit, knurl presses, bayoneting, fused materials, weaves, knits, braids, hook and loop fasteners, and/or combinations thereof to couple and/or secure the lock collar 80 to the plunger 20.

Figure 9:
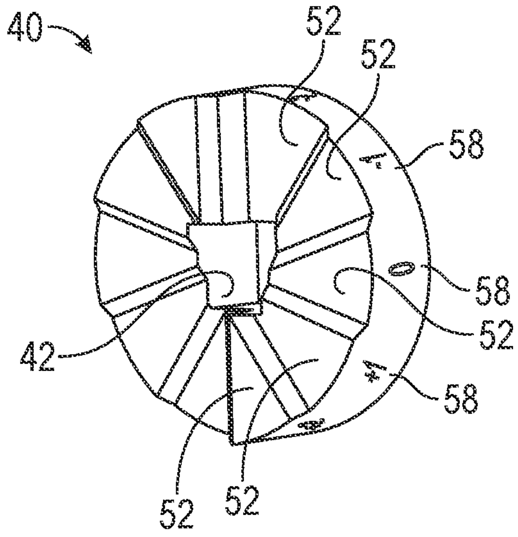
FIG. 9 illustrates a perspective view of a puck key, in accordance with implementations of the subject technology.
Figure 10:
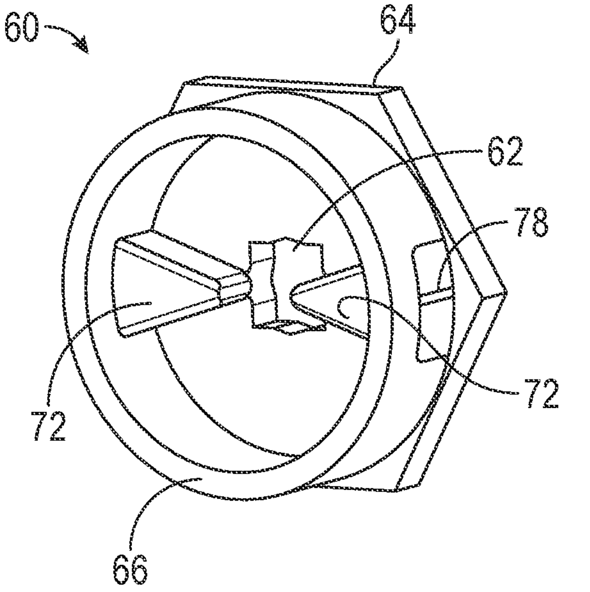
FIG. 10 illustrates a perspective view of a selector key, in accordance with implementations of the subject technology.
Figure 11:
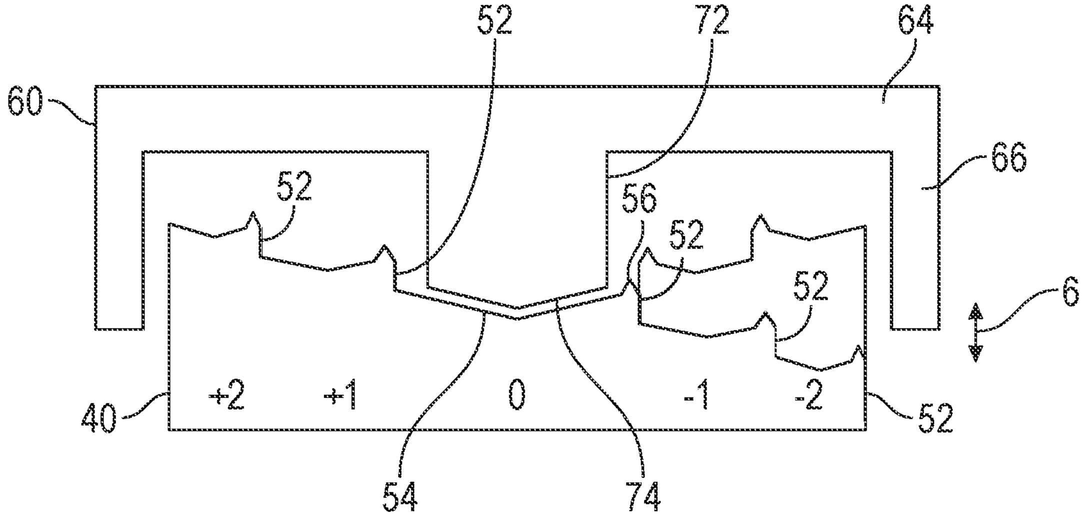
FIG. 11 illustrates a side schematic view of a puck key and a selector key, in accordance with implementations of the subject technology.

Referring now to FIGS. 9-11, the puck key and the selector key can provide engagement and adjustment capabilities to select one of multiple possible arrangements along another axis and within a range. As shown in FIG. 9, the puck key 40 can include a puck opening 42 for receiving the shaft of the plunger. The puck key 40 can further include multiple sections 52 that are distributed circumferentially around the puck opening 42. Each of the sections 52 can have a height that is different than another one or more of the sections 52. Multiple sections 52 can have the same height. For example, each section 52 can have the same height as one or more other sections 52, which can optionally be across (e.g., opposite) from each other or otherwise providing radial symmetry around the puck opening 42.

As shown in FIG. 10, the selector key 60 can include a selector opening 62 for receiving the shaft of the plunger and one or more teeth 72. The teeth 72 can be distributed circumferentially around the selector opening 62. Each of the teeth 72 can have the same height. The teeth 72 can be across (e.g., opposite) from each other or otherwise providing radial symmetry around the selector opening 62. The number, size, shape, and/or other features of the teeth 72 can correspond to the number, size, shape, and/or other features of the sections 52 of the puck key 40 having the same height as each other. For example, where two or more sections 52 of the puck key 40 have the same height and/or are distributed with radial symmetry around the puck opening 42, an equal number of teeth 72 can be provided by the selector key 60 with the same or similar radial symmetry around the selector opening 62. As such, each of the teeth 72 of the selector key 60 can simultaneously abut a corresponding one of the sections 52 of the puck key 40, where each of such sections 52 have the same height. This can help distribute forces between the puck key 40 and the selector key 60. By further example, both the teeth 72 and the sections 52 can taper as they extend radially inwardly towards the selector opening 62 or the puck opening 42, respectively.

The selector key 60 can further include a sidewall 66 extending annularly about the teeth 72 and/or the selector opening 62. The selector key 60 can further include one or more selector markers 78 indicating a rotational alignment of the selector key 60 with respect to the puck key 40. The puck key 40 can further include one or more puck markers 58 indicating a rotational alignment of the puck key 40 with respect to the selector key 60. For example, the puck markers 58 can indicate values representing the heights of corresponding sections 52 of the puck key 40. The alignment of the selector markers 78 with respect to the puck markers 58 can corresponding to and indicate an alignment of the teeth 72 with a corresponding one or more sections 52 of the puck key 40 and/or a selected distance set by the engagement of the teeth 72 of the selector key 60 with the selected sections 52 of the puck key 40. As such, by referencing the selector markers 78 and the puck markers 58, the operator can infer the selected distance along the second axis 6, as well as what other distances may be selected by rotating or otherwise operating the selector key 60.

The sections 52 and/or the teeth 72 can be arranged to provide multiple possible arrangements available for selection. For example, any number of arrangements can be provided, such as 2, 3, 4, 5, 6, 7, 8, 9, or more than 9 arrangements by selecting the arrangement of sections 52 with respect to teeth 72. Each arrangement can correspond to a different alignment along the second axis 6. Accordingly, the selected engagement between sections 52 and/or the teeth 72 can be made to achieve the desired alignment (e.g., of an interface region) of the corresponding components along the second axis 6.

As shown in FIG. 11, each of the teeth 72 of the selector key 60 can engage a corresponding section 52 of the puck key 40. The teeth 72 of the selector key 60 and/or the sections 52 of the puck key 40 can have complementary shapes and/or sizes to facilitate engagement. The sections 52 of the puck key 40 can define surfaces 54 facing in a same direction (e.g., along the second axis 6). For example, the sections 52 of the puck key 40 can define the surfaces 54 such that they provide, for example, a concave (e.g., recessed, indented, curved, etc.) shape. By further example, the teeth 72 of the selector key 60 can define surfaces 74 that provide, for example, a convex (e.g., protruding, raised, curved, etc.) shape. When urged together, the puck key 40 and the selector key 60 can resist disengagement of the teeth 72 from the sections 52 until the puck key 40 and the selector key 60 are moved away from each other along the second axis 6. It will be understood that such shapes are merely exemplary and that a variety of shapes can be provided to facilitate engagement. For example, the shapes can be altered (e.g., swapped) to be different than as shown in the figures.

As further shown in FIG. 11, the sections 52 can define discontinuities in their heights so that the teeth 72 do not move to an adjacent section 52 of a greater height until the selector key 60 is moved along the second axis 6 away from the puck key 40. As further shown in FIG. 11, the sections 52 can define other features, such as ridges 56, so that the teeth 72 do not move to an adjacent section 52 of a lesser height until the selector key 60 is moved along the second axis 6 away from the puck key 40. Each one of the sections 52 of the puck key 40 can define a ridge 56 alongside an adjacent other one of the sections 52. It will be understood that such shapes are merely exemplary and that a variety of shapes can be provided to facilitate adjustment.

Figure 12:
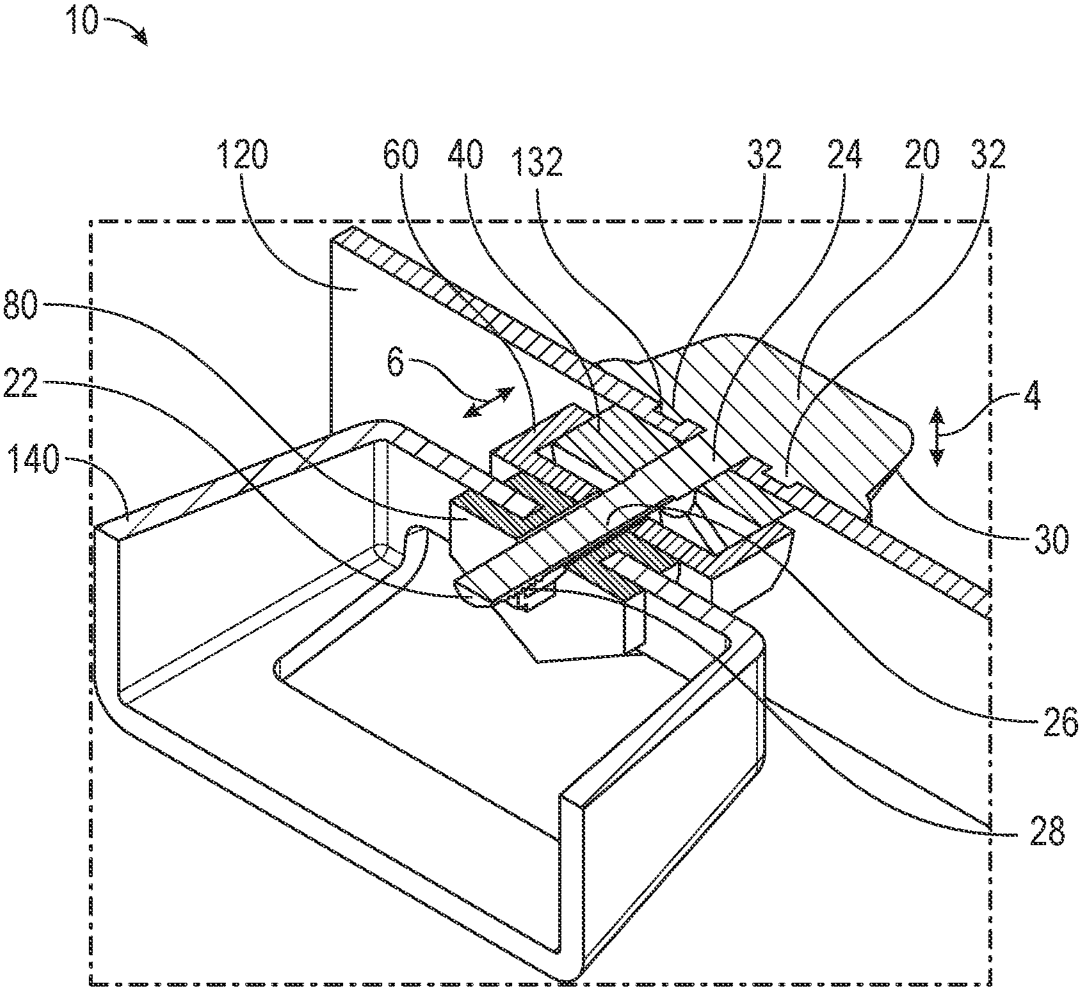
FIG. 12 illustrates a perspective sectional view of an adjustable fastener, in accordance with implementations of the subject technology.

Referring now to FIG. 12, the adjustable fastener of an adjustable assembly can provide for independent selection of an alignment in each of two axes. As shown in FIG. 12, the bracket 120 can define one or more bracket engagers 132 each for receiving a corresponding one of the one or more plunger engagers 32 of the plunger 20. The plunger engager 32 can be secured with respect to one of the multiple bracket engagers 132. While secured thereto, the plunger engager 32 can be restricted with respect to the first axis 4, such that the plunger 20 does not move along the first axis 4 until the plunger engager 32 is released from the selected one of the bracket engagers 132. Such release can be achieved, for example, by moving the plunger 20 away from the bracket 120, such as along the second axis 6, which can be limited until release of the lock collar 80 with respect to the plunger 20.

The selector key 60 can be rotated to engage a selected portion of the puck key 40. The selector key 60 can be rotated about the second section 26 of the shaft 22, while the puck key 40 can be rotationally locked to the first section 24 of the shaft 22. The rotational orientation of the selector key 60 with respect to the puck key 40 allows the teeth of the selector key 60 to engage selected sections of the puck key 40. Accordingly, a distance along the second axis 6 between the opposing ends of the puck key 40 and the selector key 60 can be selected based on the relative orientation and engagement between the puck key 40 and the selector key 60.

As further shown in FIG. 12, the lock collar 80 can be configured to adjustably engage the third section 28 of the shaft 22 and urge the selector key 60 against the puck key 40. The lock collar 80 can be provided with a rotational or other ability with respect to the mount pad 140. Rotation or other operation of the lock collar 80 can axially advance the shaft 22 with respect to the lock collar 80 until the lock collar 80 abuts the selector key 60, the selector key 60 abuts the puck key 40 (i.e., at teeth and sections), the puck key 40 abuts the bracket 120, and the bracket 120 abuts the head 30 of the plunger 20 (i.e., with plunger engagers 32 secured to bracket engagers 132). The lock collar 80 can maintain at least nominal compression to maintain the assembly of parts together along the second axis 6.

Accordingly, adjustment of the lock collar 80 with respect to the shaft 22 of the plunger 20 can modify a distance between (i) the lock collar 80, the selector key 60, and/or the mount pad 140 and (ii) the puck key 40, the bracket 120, and/or the head 30 of the plunger 20. The adjustable fastener 10 can include such features to facilitate adjustment in multiple axes and within particular ranges. Adjustment within each of the multiple axes can be achieved independently of each other. Such adjustment capabilities can help to improve the alignment of parts during and after assembly to achieve a desired arrangement with high precision and accuracy.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An adjustable fastener comprising:

a plunger comprising a head, a shaft, and a plunger engager extending from the head alongside the shaft, wherein the shaft passes through a bracket of a first component of a vehicle;

a puck key configured to receive the shaft and having multiple sections, each of the sections defining a corresponding height that is different than a height of another section;

a selector key configured to receive the shaft and comprising a tooth for contacting a selected one of the sections of the puck key, wherein:

a first position of the multiple sections relative to the tooth causes a first corresponding position of the first component relative to a second component of the vehicle to define an interface region, and a second position of the multiple sections relative to the tooth causes a second corresponding position of the first component relative to the second component to adjust the interface region; and a lock collar configured to engage the shaft and secure the selector key against the puck key, the lock collar comprising:

a first flange and a second flange defining an annular recess between the first flange and the second flange;

a lock opening configured to receive the shaft; and a lock engager configured to engage the shaft.

2. The adjustable fastener of claim 1, wherein the shaft of the plunger comprises:

a first section defining a first cross-sectional shape for rotationally engaging the puck key;

a second section defining a second cross-sectional shape for receiving the selector key, wherein the selector key is configured to be rotated about the second section; and a third section defining a thread for engagement by the lock collar.

3. The adjustable fastener of claim 1, wherein the puck key defines a puck opening for receiving the shaft, and each one of the sections of the puck key is circumferentially adjacent to another one of the sections having a different height and radially opposite another one of the sections having a same height.

4. The adjustable fastener of claim 1, wherein each one of the sections of the puck key defines a ridge alongside an adjacent other one of the sections.

5. The adjustable fastener of claim 1, wherein the sections of the puck key define surfaces facing in a same direction, each of the surfaces being concave.

6. The adjustable fastener of claim 1, wherein the tooth is a first tooth, the selector key defines a selector opening for receiving the shaft, and the selector key further comprises a second tooth, wherein the selector opening is positioned between the first tooth and the second tooth.

7. An adjustable fastener comprising:

a plunger comprising a head, a shaft for extending through a bracket, and a plunger engager configured to engage one of multiple bracket engagers of the bracket to secure an alignment along a first axis;

a puck key configured to be rotationally locked to the shaft and having multiple sections;

a selector key configured to rotate about the shaft, wherein a rotational orientation of the selector key with respect to the puck key defines a distance, along a second axis, between the selector key and the head of the plunger; and a lock collar configured to adjustably engage the shaft and urge the selector key against the puck key.

8. The adjustable fastener of claim 7, wherein the shaft of the plunger comprises:

a first section defining a first cross-sectional shape for rotationally engaging the puck key;

a second section defining a second cross-sectional shape for being received by the selector key; and a third section defining a thread for engagement by the lock collar.

9. The adjustable fastener of claim 7, wherein the puck key defines a puck opening for receiving the shaft, and each one of the sections of the puck key is circumferentially adjacent to another one of the sections having a different height and radially opposite another one of the sections having a same height.

10. The adjustable fastener of claim 7, wherein each one of the sections of the puck key defines a ridge alongside an adjacent other one of the sections.

11. The adjustable fastener of claim 7, wherein the selector key comprises:

a selector opening for receiving the shaft; and a pair of teeth on opposing sides of the selector opening.

12. The adjustable fastener of claim 7, wherein the first axis is orthogonal to the second axis.

13. A vehicle comprising:

a first component forming a bracket comprising a bracket opening and multiple bracket engagers;

a second component forming a mount pad comprising a pad opening;

a plunger comprising:

a shaft extending through the bracket opening and the pad opening; and a plunger engager configured to engage one of the bracket engagers to limit movement of the bracket across the mount pad;

a puck key having multiple sections, each of the sections defining a corresponding height that is different than a height of another one of the sections;

a lock collar extending through the pad opening and engaging the shaft of the plunger; and a selector key between the lock collar and the puck key, the selector key being rotatable to engage a selected one of the sections of the puck key that determines a corresponding distance between the bracket and the mount pad.

14. The vehicle of claim 13, wherein:

the first component is a fascia of the vehicle; and the second component is a body of the vehicle at least partially covered by the fascia, wherein the fascia is adjustably coupled to the body to form an interface region between the fascia and the body, the interface region being defined by an arrangement of the plunger relative to the bracket and the selector key relative to the puck key.

15. The vehicle of claim 13, wherein the shaft of the plunger comprises:

a first section defining a first cross-sectional shape for rotationally engaging the puck key;

a second section defining a second cross-sectional shape for receiving the selector key; and a third section defining a thread for engagement by the lock collar.

16. The vehicle of claim 13, wherein the puck key defines a puck opening for receiving the shaft, and each one of the sections of the puck key is circumferentially adjacent to another one of the sections having a different height and radially opposite another one of the sections having a same height.

17. The vehicle of claim 13, wherein each one of the sections of the puck key defines a ridge alongside an adjacent other one of the sections.

18. The vehicle of claim 13, wherein the sections of the puck key define surfaces facing in a same direction, each of the surfaces being concave.

19. The vehicle of claim 13, wherein the selector key comprises:

a selector opening for receiving the shaft; and a pair of teeth on opposing sides of the selector opening.

* * * * *